United States Patent [19]

Tsai et al.

[11] Patent Number: 5,579,185
[45] Date of Patent: Nov. 26, 1996

[54] VIDEO TAPE RECORDING/REPRODUCING APPARATUS HAVING AUTOMATIC PREDICT AND MODE CHANGING CAPABILITY

[75] Inventors: Rong-Dzung Tsai, Pingtung; Ta-Huang Liu, Tainan, both of Taiwan

[73] Assignee: Industrial Technology Research Institute, Hsinchu, Taiwan

[21] Appl. No.: 314,427

[22] Filed: Sep. 28, 1994

[51] Int. Cl.⁶ .................................................. G11B 15/46
[52] U.S. Cl. .......................................... 360/73.06; 360/71
[58] Field of Search .............................. 360/73.06, 73.2, 360/73.07, 69, 137

[56] References Cited

U.S. PATENT DOCUMENTS

| | | | |
|---|---|---|---|
| 4,963,999 | 10/1990 | Utsunomiya et al. | 360/72.3 |
| 4,996,611 | 2/1991 | Ito | 360/72.3 |
| 5,032,937 | 7/1991 | Suzuki et al. | |
| 5,117,316 | 5/1992 | Kim | 360/73.07 |
| 5,275,351 | 1/1994 | Wu et al. | |
| 5,315,452 | 5/1994 | Hong | 360/73.07 |
| 5,469,308 | 11/1995 | Hamoda et al. | 360/71 |

FOREIGN PATENT DOCUMENTS 54-53515  4/1979  Japan ................................. 360/72.3

Primary Examiner—A. Psitos
Assistant Examiner—James T. Wilson
Attorney, Agent, or Firm—Meltzer, Lippe, Goldstein, et al.

[57] ABSTRACT

An apparatus and process are disclosed for automatically changing the speed of a recording tape from a first speed to a second speed, based on a one-time determination of predicted time of changeover. The second speed is 1/n of the first speed, where n is any real number greater than 1. A central processing unit determines the time of changeover at the start of the recording process, using inputs from a recording timer and a reel detector to determine the program time and the remaining tape time on a supply reel. When the program time initially exceeds the remaining tape time at the first speed, the system automatically predicts and then implements the changeover to the second speed, such that the first speed portion is maximized to take advantage of its superior signal-to-noise ratio.

18 Claims, 3 Drawing Sheets

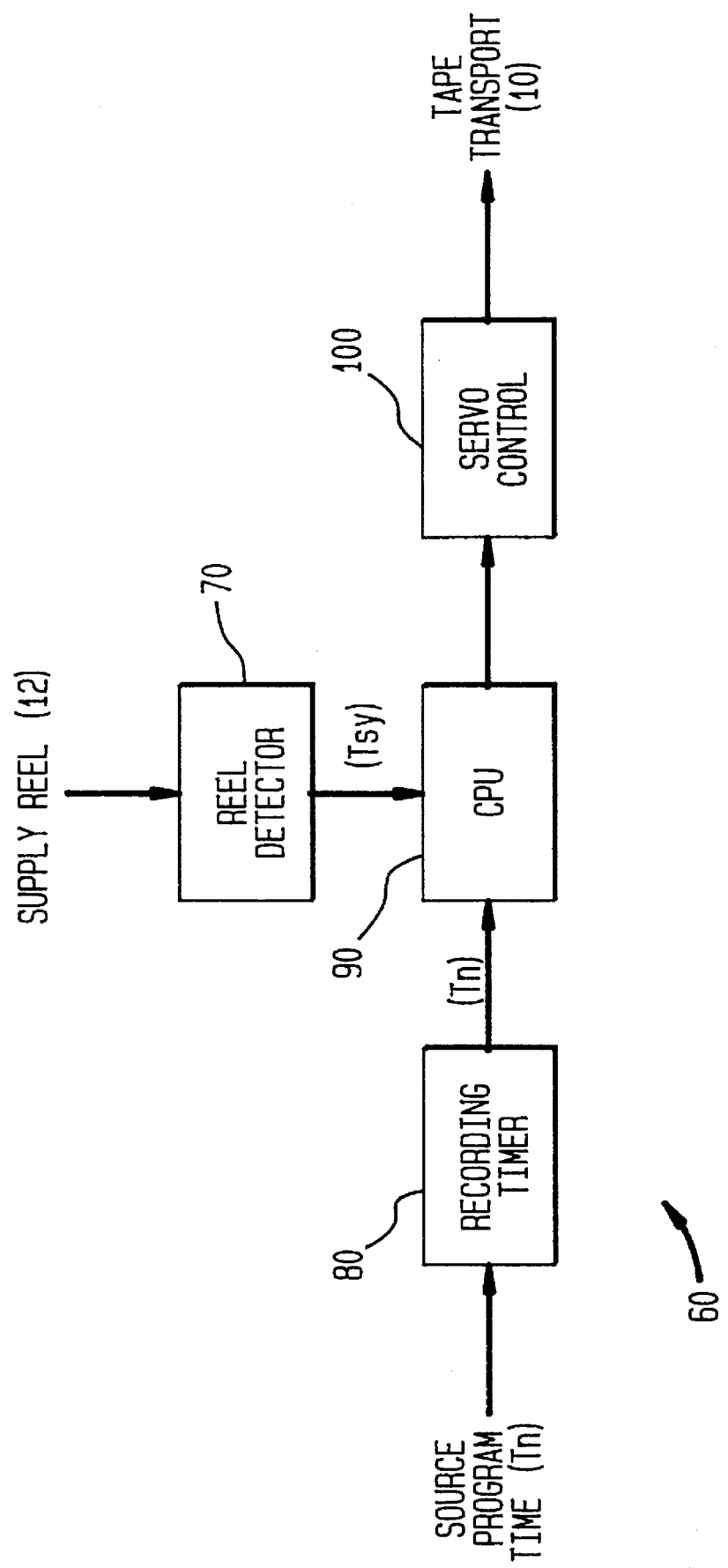

VIDEO TAPE RECORDING/REPRODUCING APPARATUS HAVING AUTOMATIC PREDICT AND MODE CHANGING CAPABILITY

RELATED APPLICATIONS

U.S. Pat. No. 5,275,351, entitled "Constant Tape Speed Controller", which was filed for Changhua Tzong-Sheau Wu, and Nantou Jing-Chung Shen on Apr. 30, 1992, and which issued on Jan. 4, 1994, is assigned to the assignee of the present application. The above-noted issued patent contains matter related to the present application and is incorporated herein by reference.

FIELD OF THE INVENTION

The present invention relates to a video tape recording and/or reproducing device with automatic capability of changing tape transport speed at a predicted time, depending on the relationship between the source program time and the remaining supply reel tape time.

BACKGROUND OF THE INVENTION

A conventional tape transport device, such as the tape transport device used in a video tape recorder/player 10, is schematically depicted in FIG. 1a. Tape 11, which is supplied from a supply reel 12, is fed between a capstan 13 and pinch roller 14 assembly to a take-up reel 15. In FIG. 1b, a cross-sectional segment of the tape 11 is shown having a thickness t. The tape itself has a total lenght L and L>>t. For example, t=20 micrometers (μm) and L=248 meters (m) for a T-120 VHS cassette tape. The transport of tape 11 is controlled by a capstan drive motor 16 connected to the capstan-pinch roller assembly 13–14. In the operation of the recorder/player, tape 11 is advanced from supply reel 12 to take-up reel 15 at one of at least two alternative speeds by capstan motor 16. Illustratively in video tape recording commonly used speeds are designated as SP mode (Standard Play speed) and EP mode (Extended Play speed), where the speed ratio of SP mode to EP mode is typically 3:1.

When a standard video tape in VHS format is rated for 120 minutes (designated T-120), the recording time is 120 minutes at Standard Play (SP) speed, or 360 minutes at Extended Play (EP) speed. The major disadvantage of recording at EP speed is that the signal-to-noise ratio (S/N) is inferior to that at SP speed. Therefore, for maximum recording fidelity, the preferred mode is SP speed. In the event that a source program exceeds 120 minutes, but does not exceed 360 minutes, a single T-120 tape may be used, through the judicious selection of SP and EP speeds. Therefore, to maximize fidelity and to complete the recording within a single T-120 tape, the recording process is started in the SP mode, and is then switched to the EP mode when the remaining source program time just equals the remaining tape time at EP speed. Moreover, the speed change is implemented automatically, to eliminate the otherwise difficult and inconvenient task of manual control by an operator.

To determine the remaining source program time, a countdown timer is typically used to progressively decrease the initial source program time by the amount of elapsed recording time. To determine the remaining tape time, the rotational period of the supply reel is measured by a detector 17 (reel rotation sensor 19 and counter 20) and processor 18 combination, then the remaining tape length is determined, and finally, the remaining tape time is determined, based on the known tape speed. These determinations may be made according to equations established by the prior art, as follows:

$$r_s = (V_t * T_{sy})/2\pi \qquad \text{Equation (1)}$$

where $r_s$ is the outer radius of the supply reel tape (FIG. 1a), $V_t$ is the tape speed, and $T_{sy}$ is the rotational period of the supply reel. Then, $$L_s = \pi(r_s^2 - r^2)/t \qquad \text{Equation (b 2)}$$

where $L_s$ is the remaining tape length on the supply reel, r is the hub radius of the supply reel, and t is the tape thickness (see FIG. 1a,b). Finally, $$T_s = L_s/V_t \qquad \text{Equation (3)}$$

where $T_s$ is the remaining tape time on the supply reel at the speed $V_t$.

In U.S. Pat. No. 5,032,937, issued on Jul. 16, 1991 (Suzuki et al.), an automatic mode change technique is disclosed, which is based on the continuous calculation of the remaining tape time, at SP speed, on the supply reel. When the remaining source program time is equal to 3 (or n) times this continuously calculated remaining tape time, the tape transport is switched to EP speed. This technique, however, requires the inclusion of complex hardware and software to achieve the continuing "on-the-fly" calculation of remaining tape time throughout the first (SP) speed operational mode.

To overcome this prior art disadvantage, it is an object of the present invention to achieve the benefits of recording fidelity and operator convenience with an automatic mode (speed) change capability, but without the additional hardware complexity required for the prior art continuous calculation of remaining tape time on the supply reel.

SUMMARY OF THE INVENTION

This object is achieved by the present invention, which provides an apparatus and a process for a one-time prediction of the optimal time of speed changeover, at the beginning of the recording process, and which then automatically implements the speed changeover at the appropriate time.

A detector is connected to a supply reel for determining a value representative of the rotational period of the supply reel. The detector output is connected to a processor for determining the remaining tape length on the supply reel, in accordance with Equations (1) and (2). The processor is then used to determine the remaining tape time on the supply reel, at a first speed, in accordance with Equation (3).

A recording timer, for receiving the total program time of the source program, is connected to the processor and outputs a signal to the processor representing the received program time progressively decreased by any elapsed recording time.

A tape transport, controlled by the processor, advances the tape from the supply reel to a take-up reel at either the first speed or a second speed. The second speed is 1/n of the first speed, wherein n is any real number greater than 1. According to one embodiment, the invention is deployed in a VHS tape recorder, wherein the first speed is the SP speed, the second speed is the EP speed, and the number n is an integer equal to 3. That is, the EP speed is ⅓ the SP speed.

At the start of the recording process, the total program time of the source program Tn is entered into the recording timer, which transmits this value to the processor. Then, the remaining tape time Ts is obtained. Illustratively, this is achieved as follows. The tape transport is activated at the first speed and begins to advance the tape from the supply reel to the take-up reel. The detector senses the rotational period of the supply reel Tsy and inputs this value to the processor. The processor determines the remaining tape time at the first speed Ts, as described above. With the known value for the source program time Tn, and the remaining tape time on the supply reel Ts, the processor then determines the predicted time of speed changeover Ta, based on the following equation:

$$Ta = n[(Tn-Ts)/(n-1)] \quad \text{Equation (b 4)}$$

where Ta is the predicted time of speed changeover, n is the ratio of first speed to second speed, Tn is the total source program time duration, and Ts is the remaining tape time on the supply reel at the first speed.

As the recording progresses, the recording timer supplies the processor with the decreasing value of source program time less elapsed recording time Tn. A comparator within the processor compares this progressively decreasing time to the previously calculated predicted time of changeover Ta. When the remaining source program time Tn is equal to the predicted changeover time Ta, the processor outputs a control signal to the tape transport, commanding it to change from the first speed to the second speed. The tape transport changes the tape advance speed and continues at the second speed until the recording is completed, at which time the supply reel tape reaches its end point.

Thus, the above described embodiment of the present invention achieves the object of optimal automatic mode (speed) change without the additional hardware and software complexity of continuously monitoring and calculating the remaining tape length on the supply reel. That is, in the present invention, only a single set of calculations is required at the start of the recording process to determine the predicted time of mode change.

The present invention will become more clearly understood from the following description of a preferred embodiment thereof, when taken in conjunction with the accompanying drawings.

BRIEF DESCRIPTION OF THE DRAWINGS

FIG. 2 is a block diagram of the control system of the inventive video tape recording system.

DETAILED DESCRIPTION OF THE INVENTION

Figure 1A:
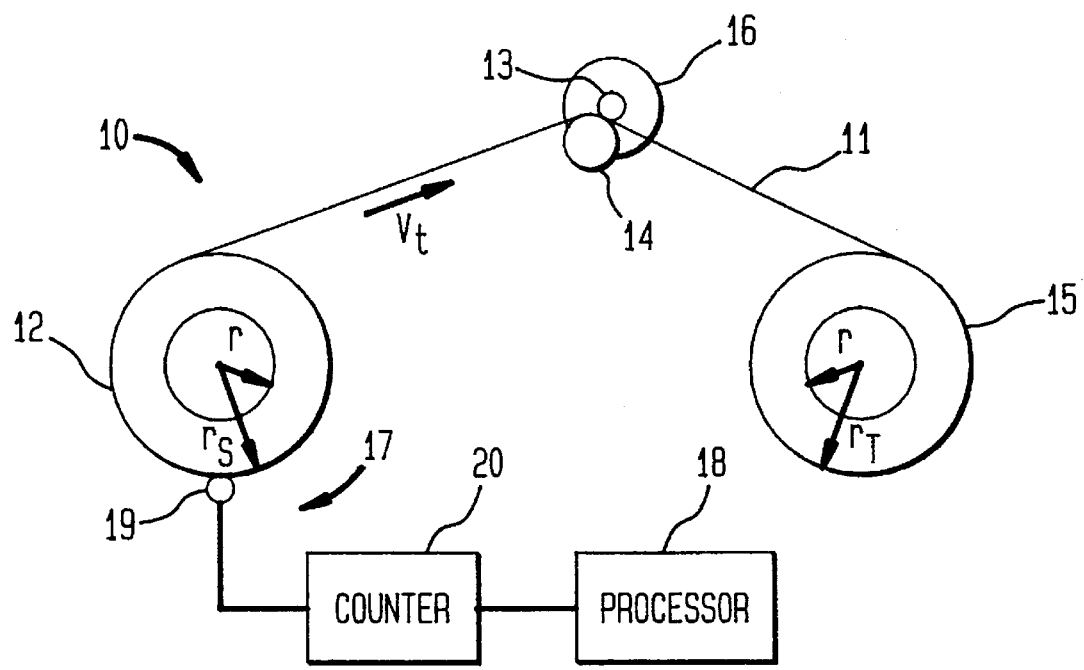
FIG. 1a pictorially depicts a conventional tape transport device.

Referring now to FIG. 2, a control system 60 according to one embodiment is depicted. A recording timer 80 receives the total value of source program time duration Tn, either manually or automatically, and progressively reduces this value by the amount of elapsed recording time, once the recording process has started. The resultant signal value Tn is supplied to central processing unit (CPU) 90. Reel detector 70 is connected to supply reel 12, thereby outputting a signal representing the rotational period of supply reel 12 Tsy to CPU 90. Determination of the desired transport speed is provided by the logic circuitry contained within CPU 90, and a command signal is outputted from CPU 90 to servo control 100. Finally, servo control 100 drives tape transport 10 at the desired speed.

Figure 1B:
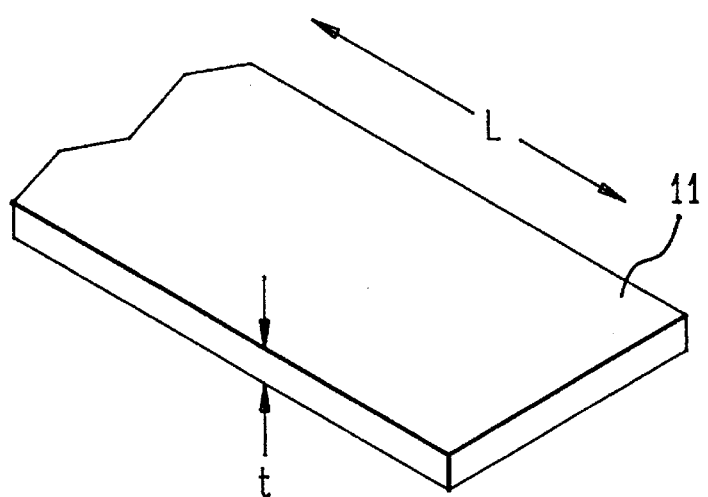
FIG. 1b depicts the conventional geometry of a cross-sectional segment of video tape.

The operation of the inventive system will now be described in greater detail with reference to FIGS. 1a, 1b, 2, and the flowchart shown in FIG. 3.

Figure 3:
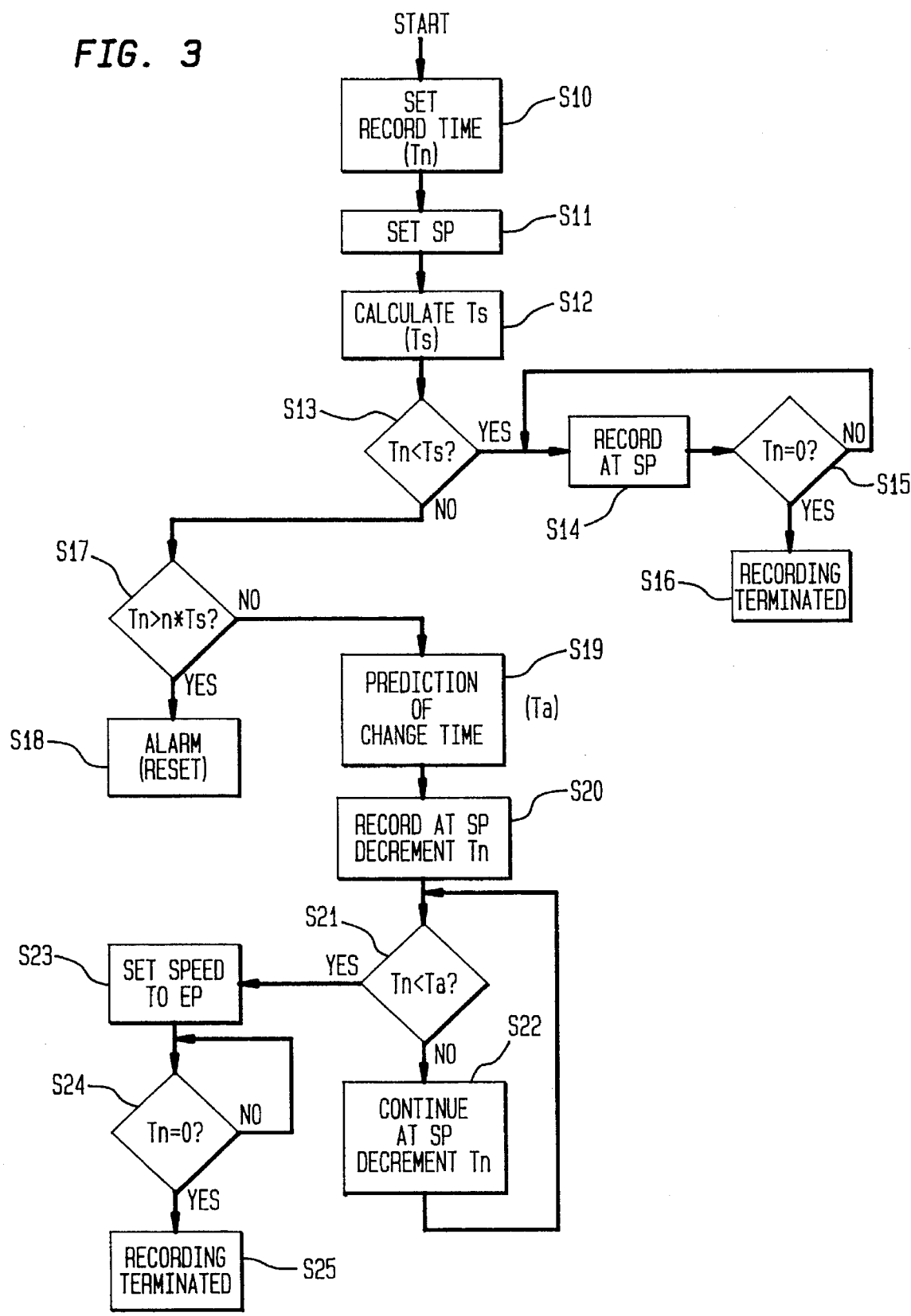
FIG. 3 is a flowchart used to explain the operation of the system according to the present invention.

Referring now to FIG. 3, the first step S10 in the recording process is the inputting of the total value of the source program time duration Tn into recording timer 80. This value may be entered manually or by an automatic mechanism not shown.

Then, subsequent to the video tape player starting a recording operation, step S11 is the activation of tape transport 10 via servo control 100. This activation begins the advance of tape 11 from supply reel 12 to take-up reel 15 at a first speed (SP speed in this embodiment), as commanded by CPU 90.

In step S12, the rotational motion of supply reel 12 is detected by reel detector 70, which outputs a signal Tsy to CPU 90. Signal Tsy represents the initial rotational period of supply reel 12 at the start of the recording process. CPU 90 then determines the supply tape outer radius ($r_s$), using Equation (1), with $V_t$, e.g., equal to SP speed, as follows:

$$r_s = (V_t * Tsy)/2\pi$$

Then, CPU 90 determines the initial remaining tape length (Ls) on supply reel 12, using Equation (2), with the known values of supply reel 12 hub radius (r) and tape thickness (t), as follows:

$$Ls = \pi(r_s^2 - r^2)/t$$

To complete step S12, CPU 90 determines the initial remaining tape time (Ts) on supply reel 12, using Equation (3), with $V_t$ equal to SP speed, as follows:

$$Ts = Ls/V_t$$

In step S13, CPU 90 compares the initial value of source program time Tn to the initial value of remaining tape time Ts. If Tn is equal to or less than Ts, the recording proceeds at SP speed (step S14) until such time as Tn is equal to zero (step S15), as determined by a comparator in CPU 90. At this point, the recording is terminated (step S16).

If the comparison of step S13, above, reveals that Tn is greater than Ts, a further comparison is made (step S17) by CPU 90 to determine if Tn is greater than n times Ts. If affirmative, an alarm signal is issued to stop the recording, and to advise the operator that the source program cannot be accommodated by the tape on the supply reel, even at EP speed (step S18).

the comparator output in step S17, above, is negative (representing the normal recording situation), CPU 90 then determines the predicted changeover time (Ta) in accordance with Equation 4 (step S19):

$$Ta = n[(Tn-Ts)/(n-1)]$$

This equation may be derived from the following relationships:

Let (Ts−x) represent the recording time at SP speed, and let n*x represent the recording time at EP speed. Then, $$(Ts-x) + (n*x) = Tn$$

where Tn is the total source program time.

It follows that $$x(n-1)=(Tn-Ts),$$

or $$x=(Tn-Ts)/(n31\ 1)$$

The predicted time of changeover Ta is defined as being equal to n*x, which is the amount of recording time necessary at EP speed to accommodate the total program time Tn. Therefore, $$Ta=n[(Tn-Ts)/(n31\ 1)]$$

which is the equation used in step S19, above.

Subsequent to the determination of Ta in step S19, above, the recording process continues at SP speed (step S20), with the value Tn now progressively decreasing as recording timer 80 decrements the value of Tn by the amount of elapsed recording time. Concurrently, this decreasing value of Tn is continuously compared to the fixed value of Ta within the circuitry of CPU 90 (step 21). If Tn is greater than Ta, the recording continues at SP speed (step S22). When Tn becomes equal to or less than Ta (step S21), CPU 90 commands servo control 100 to change to EP speed (step S23). Servo control 100 implements the speed change command to cause tape transport 10 to advance tape 11 at the second (EP) speed, which is 1/n times the first (SP) speed. The recording process continues at EP speed until Tn equals zero, as determined by a comparator within CPU 90 (step S24). At this point, the recording is terminated, coinciding with the end of the tape on supply reel 12 (step S25).

It may be helpful to illustrate the speed changeover implementation with a typical example. Given a source program of 135 minutes duration (Tn), a speed ratio (n)=3, and a tape length of 120 minutes (Ts), the implementation proceeds as follows:

$$Ta=n*x=3\{(135-120)/(3-1)\}=3*7.5=22.5$$

As in step S21, above, when the decreasing value of Tn equals 22.5 (Ta), the recording speed is switched over from SP to EP. As defined above, the time duration of SP mode recording is (Ts−x), or (120−7.5)=112.5 minutes. Similarly, the time duration of EP mode recording is n*x, or 3*7.5= 22.5 minutes. Thus, the total recording time duration equals (112.5+22.5)=135 minutes, which is equal to the total source program time (Tn).

Finally, the aforementioned embodiment is intended to be merely illustrative. Numerous alternative embodiments may be devised by those ordinarily skilled in the art without departing from the spirit and scope of the following claims.

We claim:

1. An apparatus for recording on a tape of a supply reel, having a tape time of Ts, a program having a total program time of Tn, said apparatus advancing said tape at high and low speeds and comprising:

a recording timer for receiving said program time Tn, and for decrementing said program time Tn in real time as said tape is advanced, a processor connected to said recording timer, for determining only once per recording, a recording change-over time Ta at the start of said recording, depending on said total program time Tn, said tape time on said supply reel Ts, and a ratio of said high and low speeds n, and for continually comparing said decremented program time Tn, outputted by said recording timer, to Ta while said tape is advanced, and a reel servo controller, responsive to said comparison by said processor, for, during said recording, advancing said tape at high speed until Tn<Ta, and for thereafter advancing said tape at said low speed.

2. The apparatus of claim 1 further comprising a detector connected to said supply reel, for outputting a value representing the rotational period of said supply reel to said processor.

3. The apparatus of claim 2 wherein said processor determines said tape time Ts from said supply reel rotational period, the thickness of said tape, the speed of said tape, and the hub radius of said supply reel.

4. The apparatus of claim 3 wherein the determination of said change-over time Ta is based on the following equation:

$$Ta=n[(Tn-Ts)/(n-1)]$$

where Ta is said change-over time, n is said ratio of said high and low speeds, Tn is said total program time, and Ts is said tape time on said supply reel.

5. The apparatus of claim 4 further comprising a comparator connected to said processor, wherein said comparator causes said processor to output an alarm reset signal when said total program time Tn is greater than said ratio n times said tape time Ts.

6. The apparatus of claim 5 further comprising a second comparator connected to said processor, wherein said second comparator causes said processor to terminate said recording process when said decremented program time Tn equals zero.

7. A video tape recording/reproducing apparatus for maximizing the recording time at Standard Play (SP) speed of the remaining tape on the supply reel of said apparatus when the total program time to be recorded Tn exceeds the SP speed recording time Ts of said remaining tape, said apparatus advancing said remaining tape at said SP speed and Extended Play (EP) speed and comprising:

a recording timer for receiving said program time Tn, and for decrementing said program time Tn in real time as said remaining tape is advanced, a processor connected to said recording timer, for determining only once per recording, a recording change-over time Ta at the start of said recording, depending on said total program time Tn, said SP speed recording time Ts, and a ratio of said SP and EP speeds n, and for continually comparing said decremented program time Tn, outputted by said recording timer, to Ta while said tape is advanced, and a reel servo controller, responsive to said comparison by said processor, for, during said recording, advancing said tape at said SP speed until Tn<Ta, and for thereafter advancing said tape at said EP speed.

8. The apparatus of claim 7 further comprising a detector connected to said supply reel, for outputting a value representing the rotational period of said supply reel to said processor.

9. The apparatus of claim 8 wherein said processor determines said SP speed recording time Ts from said supply reel rotational period, the thickness of said tape, the speed of said tape, and the hub radius of said supply reel.

10. The apparatus of claim 9 wherein the determination of said change-over time Ta is based on the following equation:

$$Ta=n[(Tn-Ts)/(n31\ 1)]$$

where Ta is said change-over time, n is said ratio of said SP and said EP speeds, Tn is said total program time, and Ts is said SP speed recording time on said supply reel.

11. The apparatus of claim 10 further comprising a comparator connected to said processor, wherein said comparator causes said processor to output an alarm reset signal when said total program time Tn is greater than said ratio n times said recording time Ts.

12. The apparatus of claim 11 further comprising a second comparator connected to said processor, wherein said second comparator causes said processor to terminate said EP speed recording process when said decremented program time Tn equals zero.

13. A process for recording a program having a total program time of Tn, on a tape of a supply reel having a tape time of Ts, using a tape advance apparatus having at least high and low speeds, comprising the steps of:

a) receiving said total program time Tn,
 b) at the start of said recording, determining only once per recording, a recording change-over time Ta, depending on said total program time Tn, said tape time Ts, and the ratio of said high and low speeds n,
 c) until Tn<Ta, advancing said tape at said high speed and decrementing Tn, and
 d) when Tn<Ta, during said recording, advancing said tape at said low speed.

14. The process of claim 13 wherein said step of determining said recording change-over time Ta comprises the step of evaluating the following equation:

$$Ta = n[(Tn-Ts)/(n-1)]$$

where Ta is said change-over time, n is said ratio of said high and low speeds, Tn is said total program time, and Ts is said tape time on said supply reel.

15. The process of claim 14, further comprising the steps of comparing said decremented program time Tn to zero, and terminating said recording process when Tn=0.

16. The process of claim 15, further comprising the steps of comparing said total program time Tn to said ratio n times said tape time Ts, and outputting an alarm reset signal if Tn>n*Ts.

17. A process for maximizing the recording time at Standard Play (SP) speed of the remaining supply reel tape on a video tape recording/reproducing apparatus, having at least SP and Extended Play (EP) speeds, when the total program time to be recorded Tn exceeds the SP speed recording time Ts of said remaining supply reel tape, comprising the steps of:

a) receiving a total program time Tn,
 b) at the start of said recording, determining only once per recording, a recording change-over time Ta, depending on said total program time Tn, said SP speed recording time Ts, and said ratio of said SP and EP speeds n,
 c) until Tn<Ta, advancing said tape at said SP speed and decrementing Tn, and
 d) when Tn<Ta, during said recording, advancing said tape at said EP speed.

18. The process of claim 17 wherein said step of determining said recording change-over time Ta comprises the step of evaluating the following equation:

$$Ta = n[(Tn-Ts)/(n-1)]$$

where Ta is said change-over time, n is said ratio of said Sp and EP speeds, Tn is said total program time, and Ts is said remaining tape time at SP speed on said supply reel.

* * * * *